United States Patent
Papandreou et al.

(10) Patent No.: US 12,547,913 B2
(45) Date of Patent: Feb. 10, 2026

(54) DECISION TREE TRAINING AND INFERENCE WITH MIXED PRECISION

(71) Applicant: International Business Machines Corporation, Armonk, NY (US)

(72) Inventors: Nikolaos Papandreou, Thalwil (CH); Milos Stanisavljevic, Langnau am Albis (CH); Charalampos Pozidis, Thalwil (CH); Jan Van Lunteren, Rüschlikon (CH); Cedric Lichtenau, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 18/295,307

(22) Filed: Apr. 4, 2023

(65) Prior Publication Data
US 2024/0338580 A1    Oct. 10, 2024

(51) Int. Cl.
*G06F 15/173*    (2006.01)
*G06N 5/01*      (2023.01)
*G06N 5/04*      (2023.01)

(52) U.S. Cl.
CPC .................. *G06N 5/04* (2013.01); *G06N 5/01* (2023.01)

(58) Field of Classification Search
None
See application file for complete search history.

(56) References Cited

U.S. PATENT DOCUMENTS

| | | | | |
|---|---|---|---|---|
| 2015/0379426 A1* | 12/2015 | Steele | ............ | G06N 5/025 706/12 |
| 2016/0300252 A1* | 10/2016 | Frank | ............ | G06F 21/6245 |
| 2017/0293356 A1* | 10/2017 | Khaderi | ............ | A61B 3/113 |
| 2020/0167654 A1 | 5/2020 | Guo | | |
| 2020/0218982 A1 | 7/2020 | Annau | | |
| 2020/0311559 A1 | 10/2020 | Chattopadhyay | | |
| 2022/0067512 A1 | 3/2022 | Khailany | | |
| 2022/0126864 A1* | 4/2022 | Moustafa | ............ | B60W 60/0013 |
| 2023/0359928 A1* | 11/2023 | Chen | ............ | G06N 20/20 |
| 2024/0007403 A1* | 1/2024 | Chechik | ............ | H04L 47/127 |
| 2025/0265391 A1* | 8/2025 | Chen | ............ | G06F 30/27 |
| 2025/0318773 A1* | 10/2025 | Ning | ............ | G16H 10/20 |

OTHER PUBLICATIONS

Nakandala et al., "Compiling Classical ML Pipelines into Tensor Computations for One-size-fits-all Prediction Serving", Workshop on Systems for ML at NeurIPS 2019, Vancouver, B.C., Canada, Dec. 13, 2019, 8 pages, <http://learningsys.org/neurips19/acceptedpapers.html>.

* cited by examiner

*Primary Examiner* — Phuoc H Nguyen
(74) *Attorney, Agent, or Firm* — Kelsey M. Skodje

(57) ABSTRACT

A method, system, and computer program product perform machine-learning inferences with a tree-based model. The tree-based model includes a decision tree that was trained on a first system, which is configured to perform computations with a first arithmetic precision. The inferences are performed with the tree-based model on a second system, which is configured to perform computations with an arithmetic precision that is lower than the first arithmetic precision. Performing the inference includes determining that an input feature value is equal to a threshold value of a corresponding node and, in response, using a majority voting to select a left or right path of the decision tree. The majority voting is based on historical statistical data that includes tree-path statistics.

20 Claims, 11 Drawing Sheets

DECISION TREE TRAINING AND INFERENCE WITH MIXED PRECISION

BACKGROUND

The present disclosure relates to machine learning and, more specifically, to predictive modeling based on decision trees.

Decision tree learning is a predictive modelling approach used in machine learning (ML) applications. It relies on one or more decision trees, which form the predictive model. Different types of decision trees are known, including classification trees and regression trees. Random forest and gradient boosting are ML methods based on binary decision trees (e.g., structures involving coupled decision processes). In a binary decision tree, a feature can be evaluated starting from the root node of the tree, and one of two branches of the root node can be selected. This procedure can be repeated at subsequent split nodes until a leaf node is reached, a value of which is used to assemble a final result. In methods such as random forest and gradient boosting, multiple decision trees can be "walked" in parallel until leaf nodes are reached. The results taken from the leaf nodes can then be averaged (regression) or used in a majority vote (classification).

SUMMARY

Various embodiments are directed to a method that includes providing a tree-based model. The tree-based model includes a decision tree that was trained on a first system, which is configured to perform computations with a first arithmetic precision. The inferences are performed with the tree-based model on a second system, which is configured to perform computations with a second arithmetic precision that is lower than the first arithmetic precision. For example, the first arithmetic precision and second arithmetic precision may be, respectively, a single-precision floating-point format and a half-precision floating-point format. Performing the inference includes determining that an input feature value is equal to a threshold value of a corresponding node and, in response, using a majority voting to select a left or right path of the decision tree. The majority voting is based on historical statistical data that includes tree-path statistics. In some embodiments, the historical statistical data includes statistical data collected with training data on the first system at the first precision before deploying the inference to the second system.

The method may also include defining, for each node of the decision tree, an upper threshold value in the second precision that is greater than a corresponding threshold value in the first precision, as well as comparing a current input value in the second precision to a corresponding threshold value in the second precision and to the upper threshold value in the second precision. The historical statistical data may be updated during the inference, e.g., if the current input value is lower than the corresponding threshold value in the second precision or greater than the upper threshold value in the second precision. The inference may be performed using a tree-traversal algorithm. In some embodiments, the inference is performed using a set of tensor-based operations (e.g., multiplications, comparisons, and logical functions). The tree-based model may encompass a matrix-based decision tree. In these instances, operations related to conditional checks may be performed at each node of the decision tree, including the majority voting by the set of tensor-based operations.

Input data, including input values in the first arithmetic precision, may be received. This input data can be scaled with a predefined scaling factor (e.g., a scaling factor from the tree-based model) to match a dynamic range of the second system. Scaling the input data may include adding a predefined offset factor to an exponent of the input data and/or subtracting the predefined offset factor from the exponent. In some embodiments, the input data is converted to the second precision by clipping input values larger than a maximum value of the second arithmetic precision to the maximum value, clipping input values smaller than a minimum value of the second arithmetic precision to the minimum value, and taking a required number of exponent and mantissa bits from the input data.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the Specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
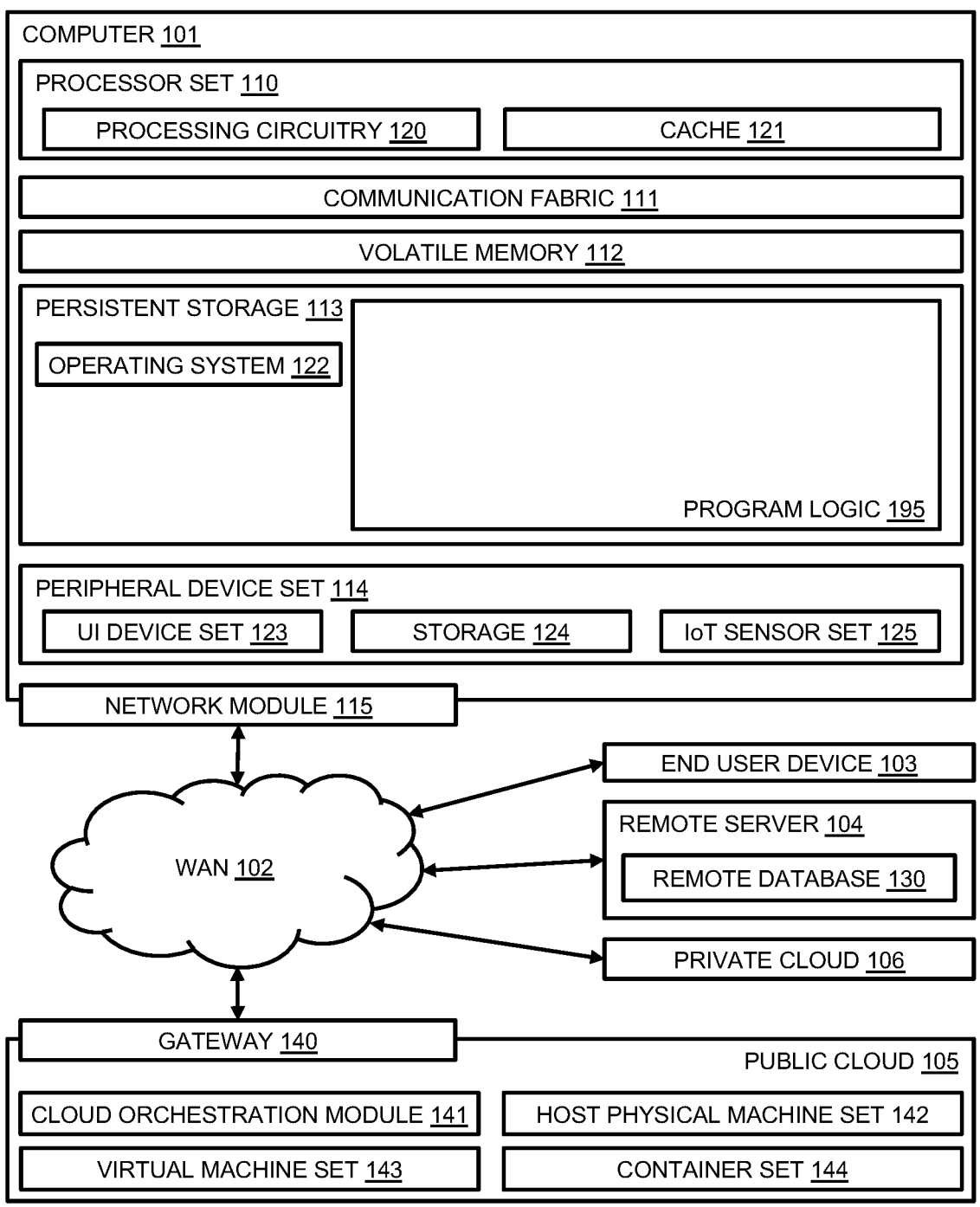
FIG. 1 is a block diagram illustrating a computing environment, according to some embodiments.

Aspects of the present disclosure relate generally to machine learning and, more specifically, to predictive modeling based on decision trees. While the present disclosure is not necessarily limited to such applications, various aspects of the disclosure may be appreciated through a discussion of various examples using this context.

Decision tree learning is a predictive modelling approach used in machine learning (ML). It relies on one or more decision trees, forming the predictive model. Decision trees are widely used machine learning algorithms, owing to their simplicity and interpretability. Different types of decision trees are known, including classification trees and regression trees. A binary decision tree is a structure involving coupled decision processes. Starting from the root, a feature is evaluated, and one of the two branches of the root node is selected. This procedure is repeated until a leaf node is reached, a value of which is used to assemble a final result.

Random forest and gradient boosting are machine learning methods based on binary decision trees. In such methods, multiple decision trees can be "walked" in parallel until leaf nodes are reached. The results taken from the leaf nodes can then be averaged (regression) or used in a majority vote (classification). Such computations can be time and resource consuming, creating a need for accelerated tree-based inference (e.g., for ensemble models such as random forest and gradient boosting methods).

Hardware (HW) accelerators based on high performance matrix-multiplication circuitry are currently being developed to accelerate ML workloads. Typically, these accelerators support reduced data precision compared to the single-precision floating point (FP32) format typically used in CPU-based systems.

Disclosed herein are techniques that may be used to apply tree-based models in systems with varying precision. In some embodiments, a tree-based model is trained on a system having a first arithmetic precision and deployed on a system having a second, lower arithmetic precision. To deploy the model on the second system, decision tree data (e.g., feature values, threshold values, etc.) from the model trained on the first system can be converted to the lower precision. This conversion to lower precision, combined with rounding effects, may impact the accuracy of decision rules at one or more of the decision tree nodes. For example, when an input feature value is equal to a lower-precision threshold value of a corresponding node, there can be uncertainty with respect to the threshold in the higher precision. In some embodiments, when an uncertainty such as this is detected at a node, the tree-based model may use additional information to assist the decision. For example, historical data (e.g., tree-based statistics collected during training of the model at the higher precision) can be used for a majority voting to select a path at the node. In further embodiments, the statistical data may optionally be updated while running inferences. This may allow continuous improvements to the accuracy of the model predictions.

The aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a block diagram illustrating a computing environment 100, according to some embodiments of the present disclosure. Computing environment 100 contains an example of a program logic 195 for the execution of at least some of the computer code involved in performing the inventive methods, such as providing a tree-based model trained on a first system and performing inferences on a system with lower precision than that of the first system. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
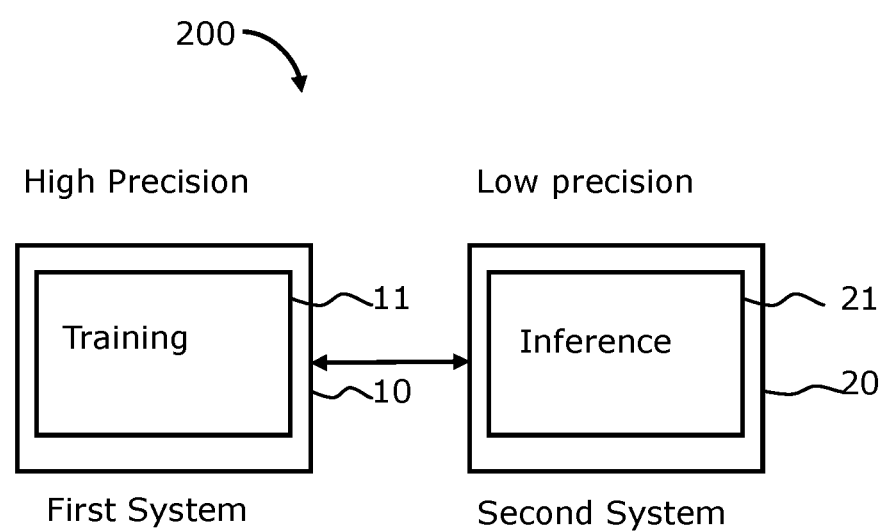
FIG. 2 is a block diagram illustrating a first system for model training and a second system for performing inferences, according to some embodiments.

FIG. 2 is a block diagram illustrating a computing environment 200 for machine learning training and inferences, according to some embodiments. Environment 200 can include a first system 10 and a second system 20, each configured to perform computations, in particular in the context of machine learning training and machine learning inference.

The first system 10 may be configured to train a tree-based model that includes a decision tree. In some embodiments, the first system 10 trains the tree-based model with a first arithmetic precision, e.g., a single-precision floating-point format (FP32). The first system 10 may include a module 11 having instructions/code for performing the training of the tree-based mode.

The second system 20 may perform an inference of the tree-based model trained on the first system 10. In some embodiments, the second system 20 is configured to perform computations with a second arithmetic precision, e.g., a half-precision floating-point format (FP16). The second system 20 may include a module 21 having instructions/code for performing an inference of the tree-based model that was trained on the first system 10. Examples of training and inferences carried out by the first 10 and second systems 20 are discussed in greater detail below.

Figure 3A:
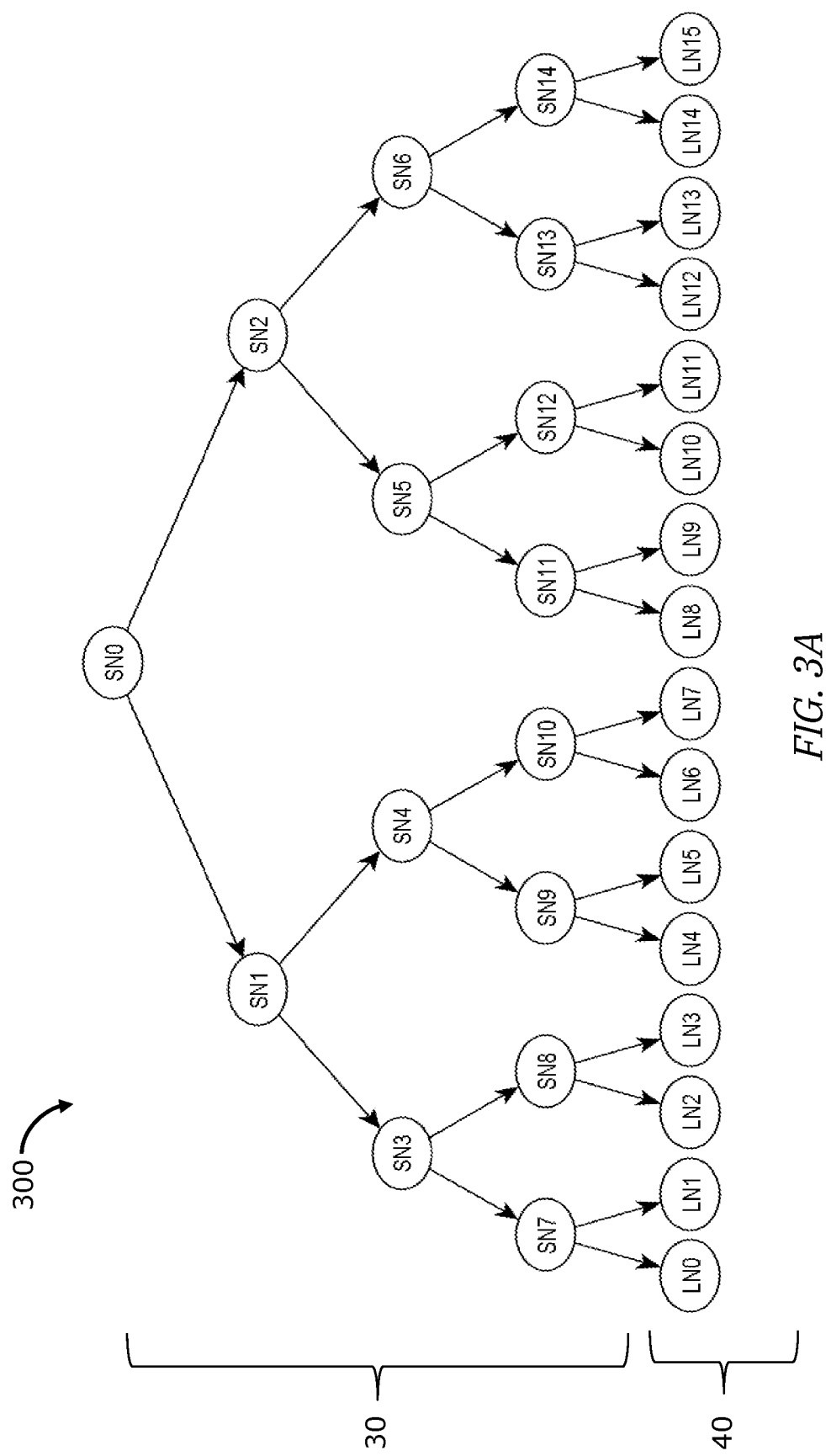
FIG. 3A is a tree diagram illustrating a binary decision tree for performing machine learning inferences by a tree-based model, according to some embodiments.

FIG. 3A is a tree diagram illustrating a binary decision tree 300 for performing machine learning inferences by a tree-based model, according to some embodiments. Binary decision tree 300 has nodes 30, 40 extending from a root node. These nodes include split nodes 30 (also known as internal nodes) and leaf nodes 40. The split nodes 30 are also denoted by references SN0 (corresponding to the root node) to SN14, and the leaf nodes 40 are denoted by references LN0 to LN15. In an illustrative example, there can be K input records to be processed through N decision trees (e.g., binary decision tree 300), where K≥1 and N≥1. As illustrated by binary decision tree 300, each decision tree T(i) of the N decision trees can have nodes extending from a root node to leaf nodes across L(i) levels. The decision trees T(i) do not necessarily all have the same number of levels.

Each node 30, 40 has attributes (see FIG. 3B), which can include operands (as required to execute the nodes), feature identifiers (also called feature selectors), and thresholds/threshold values (used for comparisons). More generally, the node attributes may include all arguments/parameters needed for evaluating the rules captured by the decision tree nodes. Each split node 30 of decision tree 300 may be labelled with a feature identifier and associated with a threshold/threshold value to perform an operation (e.g., where a feature value corresponding to a feature identifier is compared to a threshold value).

Figure 3B:
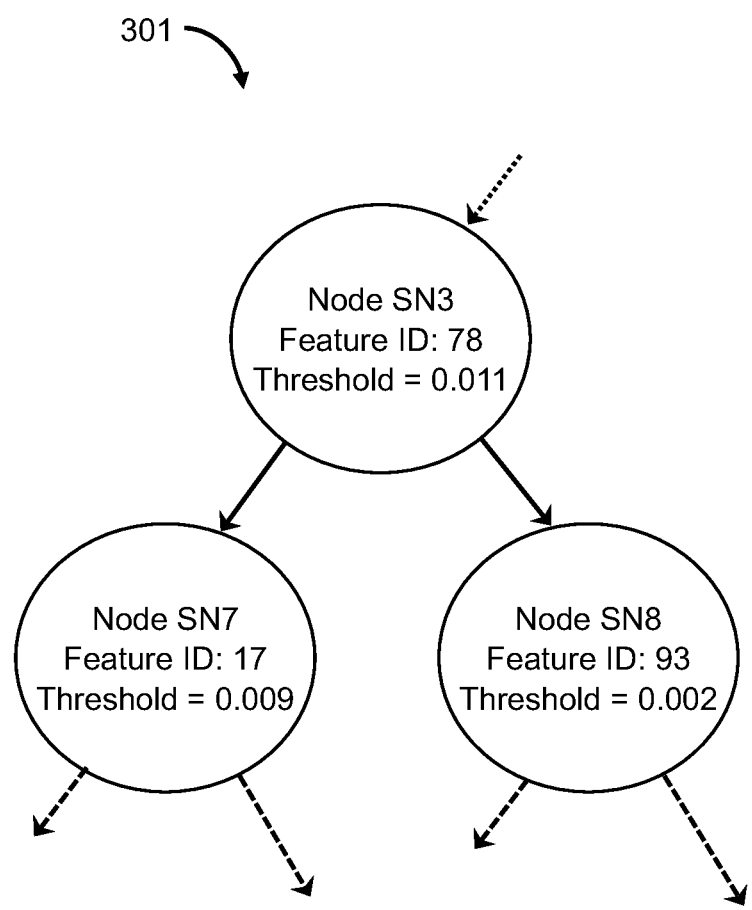
FIG. 3B is a tree diagram illustrating selected nodes from the binary decision tree of FIG. 3A, according to some embodiments.

FIG. 3B is a tree diagram illustrating selected nodes 301 of binary decision tree 300, according to some embodiments. The portion 301 includes split nodes (SN3, SN7, and S8) selected from the split nodes 30 shown in FIG. 3A, as well as respective node attributes. Specifically, each node in FIG. 3B is illustrated with respective feature identifier values ("feature ID") and threshold values.

In some embodiments, the machine learning inferences of binary decision tree 300 are performed using the second system 20 illustrated in FIG. 2, and the tree-based model may be trained by the first system 10.

Figure 4A:
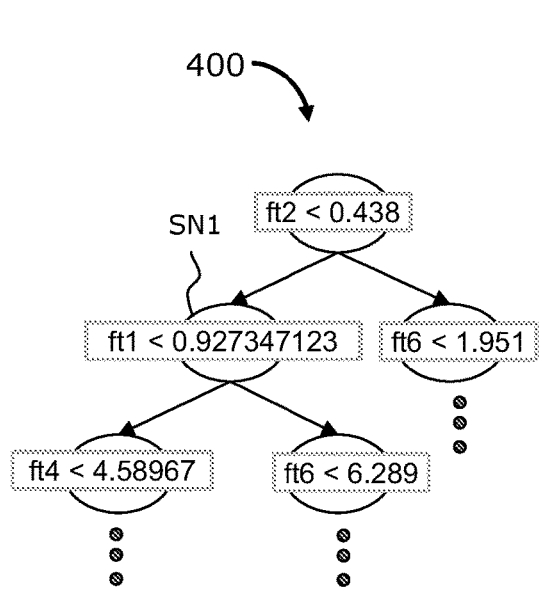
FIG. 4A is a tree diagram illustrating a decision tree from a tree-based model that was trained on the first system, according to some embodiments.

FIG. 4A is a tree diagram illustrating a decision tree 400 from a tree-based model that was trained on the first system 10, according to some embodiments. As discussed above, the first system 10 is configured to perform computations with a first arithmetic precision. Thus, in this example, decision tree 400 has been trained at the first arithmetic precision. In the following it is assumed that the first arithmetic precision is embodied as single-precision floating-point format (also referred to as "FP32 data representation" or "float32 data format"). This is a computer number format which usually occupies 32 bits in a corresponding computer memory. In decision tree 400, an example split node SN1 has a threshold value of 0.927347123 in the FP32 data format. The threshold value can be compared to a corresponding input feature value ft1 at SN1 in order to determine whether ft1 is lower than the threshold 0.927347123.

Figure 4B:
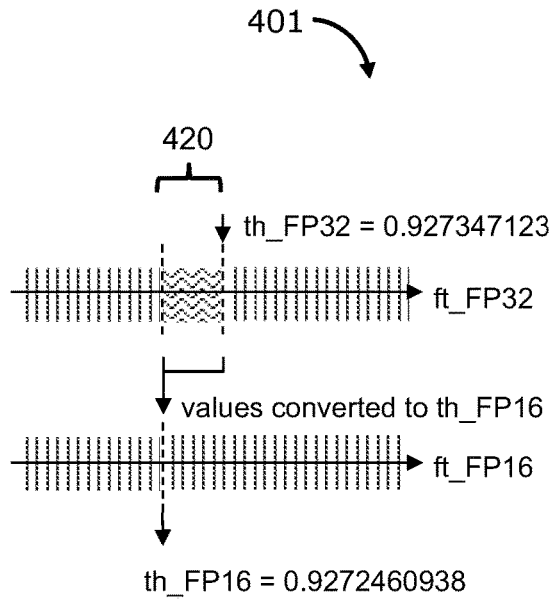
FIG. 4B is an example inference to be performed by the tree-based model of FIG. 4A on the second system, according to some embodiments.

FIG. 4B illustrates an example inference 401 to be performed on the second system 20, according to some embodiments. As discussed above, the second system 20 can be configured to perform computations with a second arithmetic precision. The second arithmetic precision can be lower than the first arithmetic precision. In the illustrated inference 401, it is assumed that the second arithmetic precision is embodied as half precision format (also referred to as "FP16 data representation" or "float16 data format"). This is a binary floating-point format that usually occupies 16 bits in computer memory. The format may be in particular used for storage and/or computing of floating-point values in applications where higher precision is not essential.

As the inference 401 is performed with the second arithmetic precision (FP16) the corresponding input features and node threshold values (FIG. 4A) of the tree-based model are converted from FP32 to FP16 before running the inference algorithm. This conversion to the lower precision together with the rounding effect results in a precision loss which may impact the accuracy of the decision rules of the nodes. This is particularly true when a feature value ft is equal to a threshold th of a corresponding node (where ft==th). This results in an uncertainty with respect to the threshold th_FP32=0.927347123 of SN1 in the first precision. In FIG. 4B, this is represented by an uncertainty area 420 (illustrated by a zig zag pattern) below the threshold th_FP32=0.927347123. In the uncertainty area 420, all values of the first precision would be converted to the same threshold value at the second precision, namely to the threshold th_FP16=0.9272460938. Above and below the uncertainty area 420, the conversion would obtain a correct result (illustrated by a vertical line pattern). In the following, the term "uncertainty" for a decision rule will refer to cases where an input feature value ft is equal to the threshold th of a corresponding node when a tree-based inference is running on a system with lower precision than the system used to train the tree-based model.

Figure 4C:
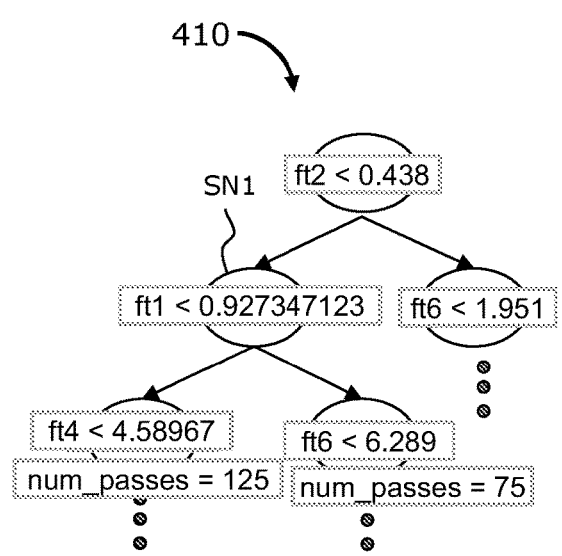
FIG. 4C is a tree diagram illustrating an enhanced decision tree from the tree-based model of FIG. 4A, according to some embodiments.

FIG. 4C illustrates an enhanced decision tree 410 of the tree-based model corresponding to the decision tree 400 shown in FIG. 4A, according to some embodiments. FIG. 4C illustrates an example in which uncertainty (e.g., in the uncertainty area 420 of FIG. 4B) may be resolved. In order to assist and improve the decision in the uncertainty area 420, the tree-based model can use additional information from the enhanced decision tree 410, such as statistical data that can be used for a majority voting to select a path (right or left path) at the corresponding split nodes. The historical statistical data may encompass, for example, statistical data collected with training data on the first system 10 in the first precision before deploying the tree-based model to the second system 20 and before performing the inference on the second system 20 with the second precision. In some embodiments, the historical statistical data includes tree-based statistics, e.g., statistics about the number of passes (num_passes) of a respective tree path.

In the enhanced decision tree 410 of FIG. 4C, the split node SN1 includes information that was not included in the decision tree 400 of FIG. 4A. Specifically, SN1 in the enhanced decision tree 410 includes historical statistical data indicating that, during training of the tree-based model, the left path was taken 125 times (num_passes=125), while the right path was only taken 75 times (num_passes=75). Accordingly, based on this historical statistical data, an inference algorithm may select the left path in the uncertainty area 420 because the left path was taken more often in the past.

Statistics of hot/cold paths may be used to assist the decision in the uncertainty area 420 in some embodiments. In particular, when ft==th, the decision outcome may be improved by using a majority voting to select the left or right path, based on previous statistics collected with training data at the original (first) precision before deploying the inference to the system with the lower (second) precision. According to some embodiments, such statistics could be embedded in the model during training or during a preprocessing step before deploying the model (e.g., by a variable indicating the absolute number of passes through a node or the probability of passes).

According to embodiments, this idea may be effectively applied to both software and hardware implementations of tree-based inference using either classical tree-traversal or tensor-based algorithms.

As discussed above, the historical statistical data may be at first collected during a training of the corresponding model. In some embodiments, the historical statistical data may also be collected and updated during inference (e.g., by using the test data).

Figure 4D:
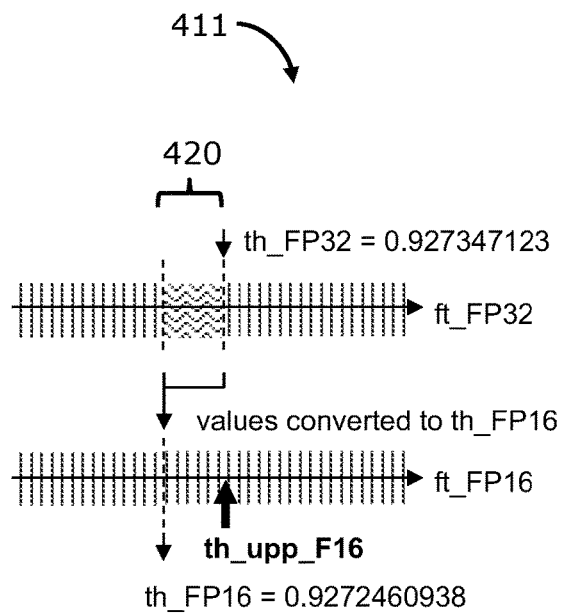
FIG. 4D is an example inference including a dynamic update of the tree-path statistics of the enhanced decision tree of FIG. 4C, according to some embodiments.

FIG. 4D illustrates an inference 411 with a dynamic update of historical statistical data, according to some embodiments. In this example, a tree-based model that includes the decision tree 410 shown in FIG. 4C can be used as an initial starting point for a majority voting of the split node S1. Then, for each split node of the decision tree 410, an upper threshold value may be defined in the second arithmetic precision, where the upper threshold value is greater than a corresponding threshold value in the first arithmetic precision. For each node, a threshold th_upp_F16, which is greater than the corresponding threshold value th_FP32, may be defined in FP16. For the example of the split node SN1 of FIG. 4C, the threshold value th_upp_F16 is chosen greater than th_FP32=0.927347123.

Then, during the inference 411, it is evaluated whether a respective current input feature value in the second precision is lower than the corresponding threshold value in the second precision (th_FP16) or greater than the defined upper threshold value in the second precision (th_upp_FP16). An update of the historical statistical data with the decision of the current run is only performed if the evaluation has resulted in a positive outcome.

Referring again to the example of FIG. 4D, if the respective input value for the split node SN1 after conversion/quantization (in FP16) is lower than th_FP16 or greater than th_upp_F16, then and only then is the node decision result used to update the historical statistical data. Such a scheme may facilitate a continuous improvement of the historical statistical data, while avoiding "fresh" historical statistical data that is based on decisions in the uncertainty regime 420.

Figure 5A:
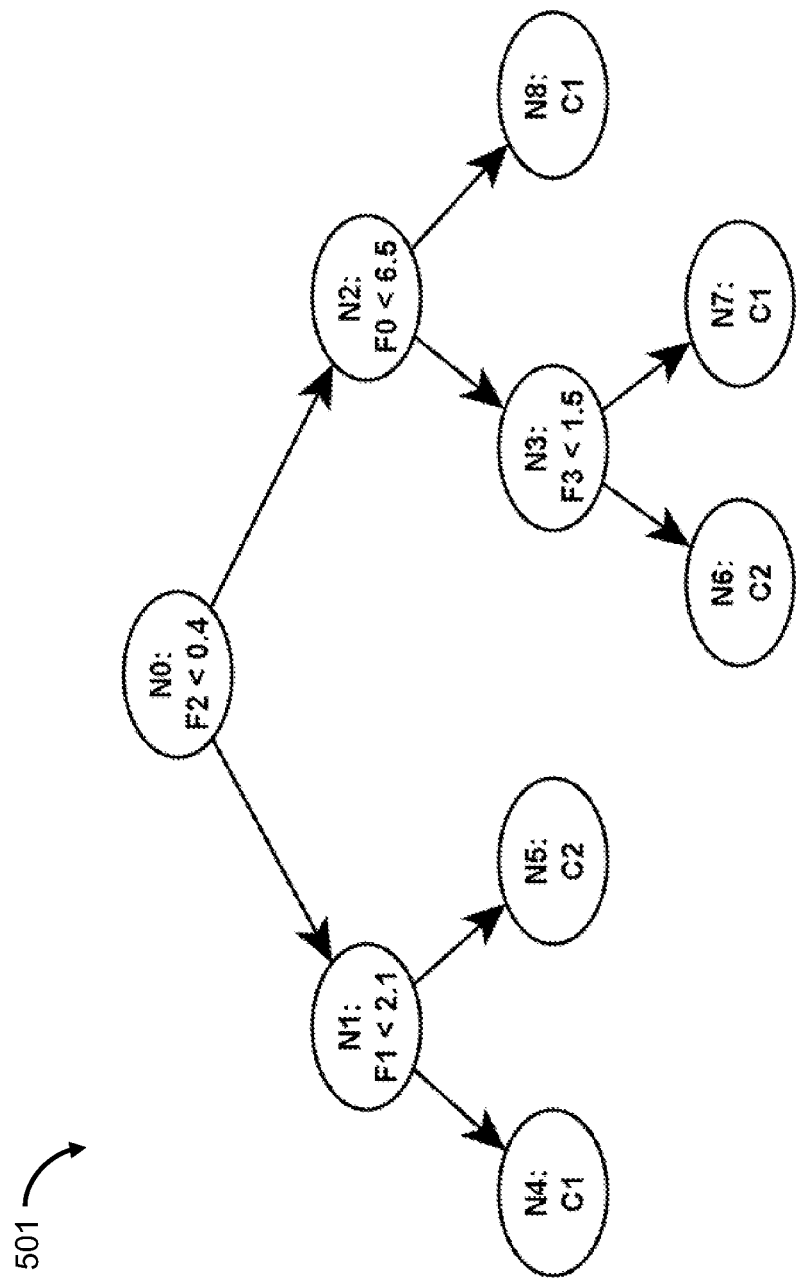
FIGS. 5A, 5B, 5C, and 5D illustrate a process of performing an inference using tensor-based operations, according to some embodiments.

FIGS. 5A, 5B, 5C, and 5D illustrate a process of performing an inference using tensor-based operations, according to some embodiments. As shown in FIGS. 5A-5D, evaluation of a decision tree can be cast as a series of three matrix multiplication operations interleaved by two element-wise logical operations. The tensor operations may be decomposed into five operations for each input record and each decision tree. These operations make use of five matrices (A, B, C, D, and E) representing the structure of a corresponding decision tree. An example of such a decision tree 501 is shown in FIG. 5A.

Figure 5B:
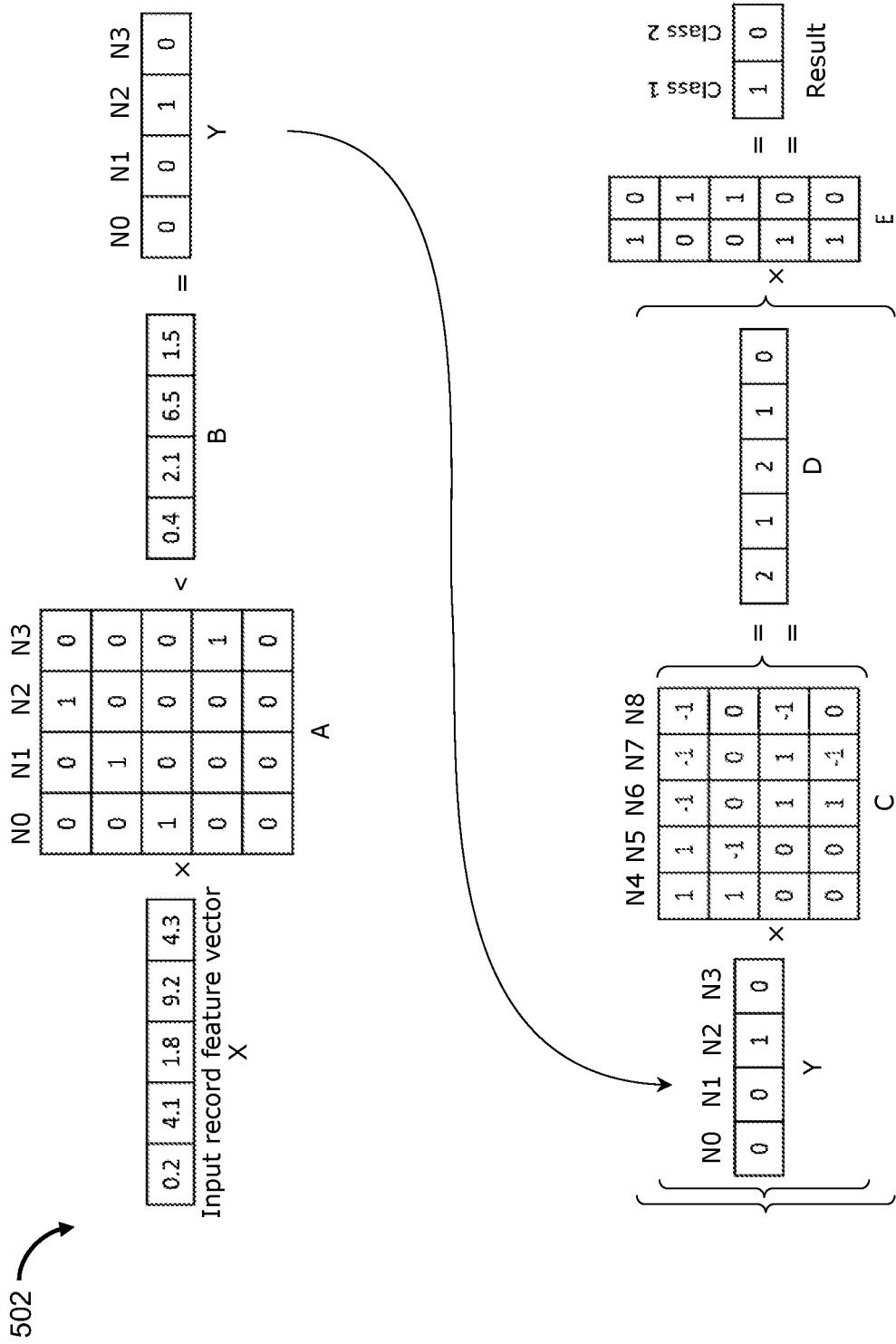

FIG. 5B is a diagram 502 showing how the decision tree 501 of FIG. 5A can be evaluated based on the five matrices for a given input record. A vector X captures feature values of this input record. Matrix A captures relationships between input features and split nodes (also called internal nodes) of the tree 501. The number of columns of matrix A corresponds to the number of split nodes of the tree 501. In the simple example shown in FIG. 5A, the tree 501 considered has only four split nodes N0, N1, N2, and N3, resulting in four columns for matrix A. Vector B includes comparands which are set to the threshold values of the split nodes of the tree 501. Matrix C captures, for any leaf node and internal (split) node pair, whether the internal node is part of the path from the root node to the leaf node, and if it is, whether the path continues from the particular internal node to the right or to the left branch. The number of columns of matrix C corresponds to the number of leaf nodes of the tree 501. In the example of FIG. 5A, the tree considered has five leaf nodes N4, N5, N6, N7, and N8, which result in five columns for matrix C. Vector D includes second comparands, each corresponding to the count of right or left branches in the paths from the root node to the leaf nodes.

Using matrices as described above with respect to FIG. 5B, the tensor operations can be generally decomposed into a sequence of five operations 511-515 for each input record and each decision tree. The second operation 512 of the five operations can include sub-operations 512*a*-512*e* for implementing an updated decision rule in the uncertainty regime, e.g., in cases where the rounding effect results in precision loss that may impact the accuracy of the decision rule of the corresponding node.

Figures 5C, 5D:

FIG. 5C illustrates a mathematical description 504 of operations 511-515, according to some embodiments. At operation 511, a product of the row vector X and the matrix A is computed. This yields a first result ("res1"). At operation 512, a comparison is performed between the first result "res1" and the row vector B. This leads to a second result, which may generally be captured by a row vector.

In some embodiments, the second step 512 comprises five sub-operations 512*a*, 512*b*, 512*c*, 512*d* and 512*e* to address uncertainty in the uncertainty regime. These sub-operations 512 are shown in FIG. 5D. At sub-operation 512*a*, a first comparison is performed between the first result "res1" and the row vector B. More particularly, it is checked whether "res1"<B. This leads to a first sub-result "res2_*a*" (a row vector). In the example of FIG. 5D, it is assumed that the input feature values in vector res1 are greater than, or equal to, the corresponding threshold values in vector B.

At sub-operation 512*b*, another comparison is performed between the first result "res1" and the row vector B. More particularly, it is checked whether "res1"==B in a pairwise comparison of the respective feature values of the input vector with the corresponding thresholds. This leads to a second sub-result or, in other words, result vector "res2_*b*." In the result vector res2_*b*, a value of 1 indicates the possibility of an uncertainty, while a value of 0 indicates that there is no uncertainty for the decision of the corresponding node.

At sub-operation 512*c*, an AND operation is performed between the first sub-result "res2_*a*" and the complement of the second sub-result "res2_*b*." This leads to a third sub-result or, in other words, a result vector "res2_*c*."

At sub-operation 512*d*, an AND operation is performed between the second sub-result res2_*b* and a majority voting vector MVV. The majority voting vector MVV includes a majority voting for the split nodes of the decision tree 501 based on the historical statistical data of the corresponding decision tree. More particularly, the majority voting vector MVV comprises a value 1 for the left path and a value 0 for the right path based on the most probable path from each node according to the historical statistical data. This leads to a fourth sub-result or, in other words, a result vector "res2_*d*."

In some embodiments, the tree-based model may encompass a plurality of decision trees which may be walked through in parallel. According to such an embodiment, a plurality of majority voting vectors MVV for each of the corresponding decision trees may be provided.

At a final sub-operation 512*e*, an OR operation can be performed between the third sub-result res2_*c* and the fourth sub-result res2_*d*. This leads to the second result "res2" (a row vector), which takes into account a possible uncertainty area and decides, in cases of uncertainty, by means of a majority voting provided by the majority voting vector MVV.

Referring again to FIG. 5C, operation 513 can be carried out after having performed the sub-steps 512*a*, 512*b*, 512*c*, 512*d* and 512*e* of operation 512.

At operation 513, a product of the row vector res2 by matrix C yields a third result (another row vector), which is compared with the row vector D at operation 514. Operation 514 provides a fourth result (a row vector Z), not explicitly shown in FIG. 5B. At operation 515, a product of the row vector Z by the matrix E results in a fifth result (a row vector). The fifth result represents an inference result, corresponding to the outcome of executing the tree 501 with respect to the input record X.

Examples such as those illustrated in FIGS. 5A-5D, may include implementing a tensor-based tree traversal inference scheme that can handle uncertainties in an uncertainty area caused by different precisions used in training and inference.

Figure 6:
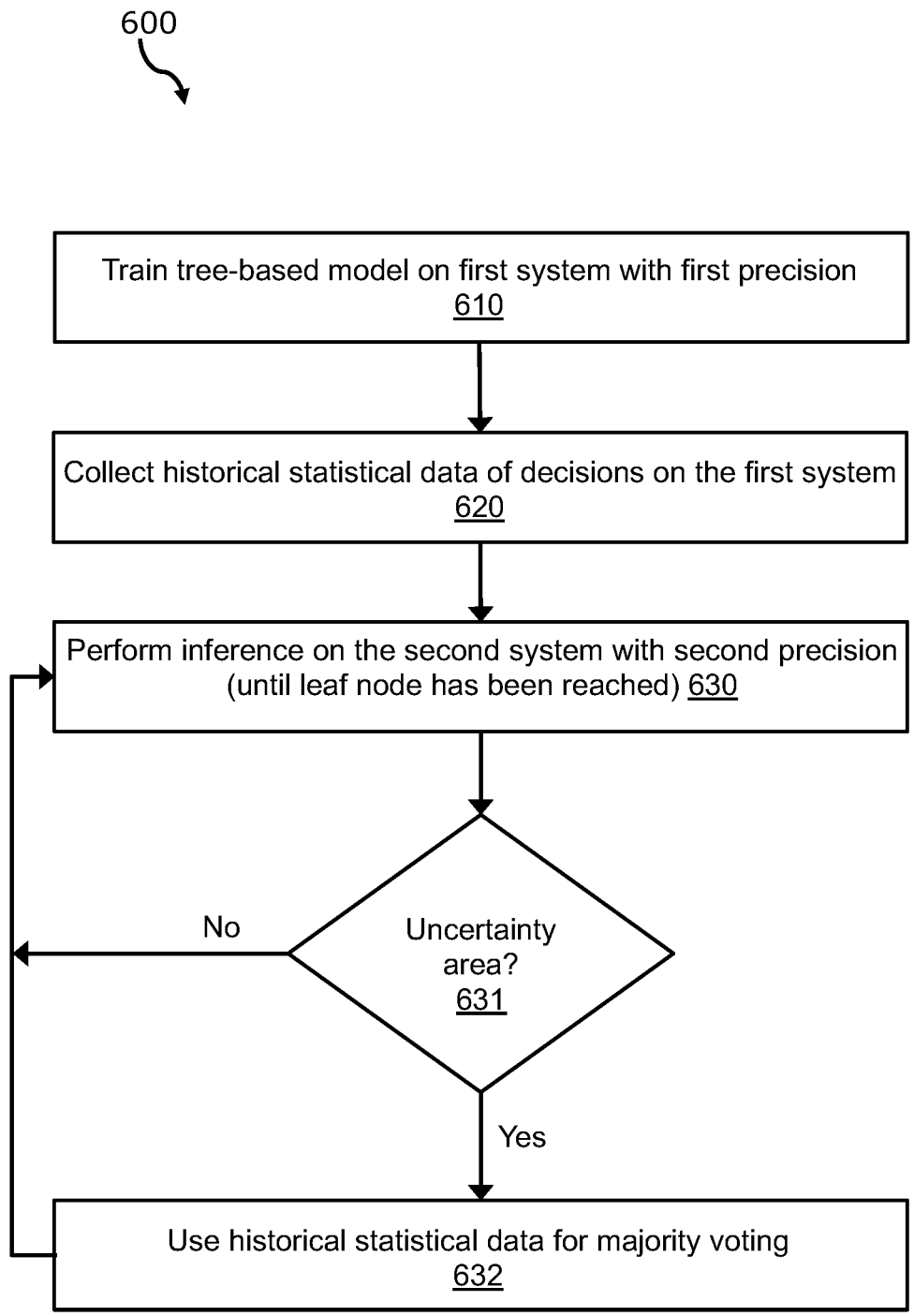
FIG. 6 is a flowchart illustrating a process of training a machine learning model and a performing a subsequent machine learning inference, according to some embodiments.

FIG. 6 is a high-level flowchart illustrating a process 600 of training a machine learning model and performing a subsequent machine learning inference, according to some embodiments. The machine learning model can be a tree-based model that includes a decision tree. The tree-based model can be trained on a first system (e.g., the first system 10 of FIG. 2), which performs computations with a first arithmetic precision. This is illustrated at operation 610. Historical statistical data of decisions on the first system can be collected. This is illustrated at operation 620. In some embodiments, operation 620 may be implemented as part of the training step 610.

A machine learning inference can then be performed on a second system (e.g., the second system 20 of FIG. 2), which performs the computations with a second arithmetic precision. This is illustrated at operation 630. The second arithmetic precision can be lower than the first arithmetic precision. During the tree-traversal of operation 630, it can be determined at a respective node of the decision tree whether the corresponding input value is within an uncertainty area. This is illustrated at operation 631. In particular, it may be determined, at operation 631, if a respective threshold value at the corresponding tree node is equal to the respective input value. This is also denoted as an equal condition. If the input value is not within an uncertainty area, a decision is taken, and process 600 returns to operation 630 to continue traversing the tree until a leaf node is reached.

However, if the input value is within the uncertainty area at operation 631, a majority voting can be performed to select the left or right path of the node based on the historical statistical data stored in the tree-based model. This is illustrated at operation 632. Process 600 may then return to operation 630.

Figure 7A:
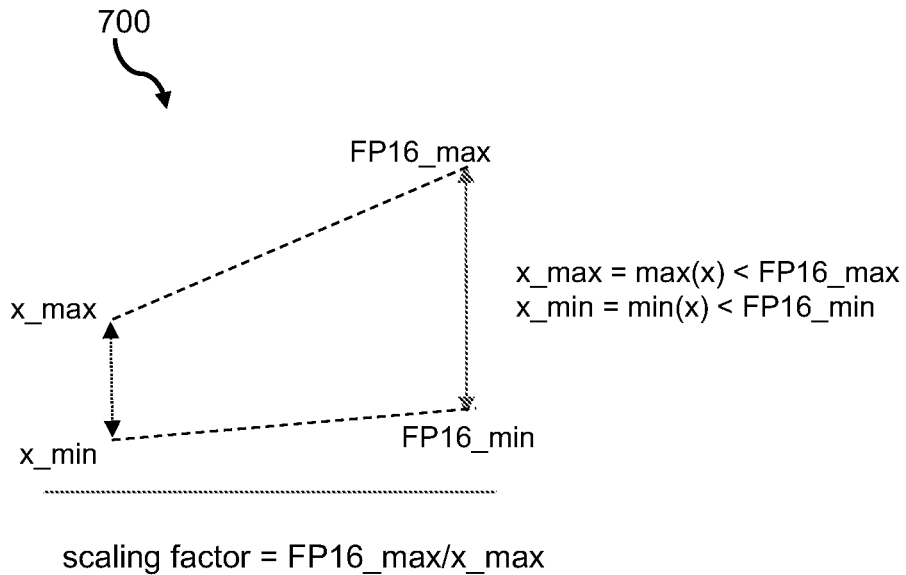
FIG. 7A and FIG. 7B are mathematical diagrams illustrating example conversions of input data that include dynamic range adjustments, according to some embodiments.
Figure 7B:
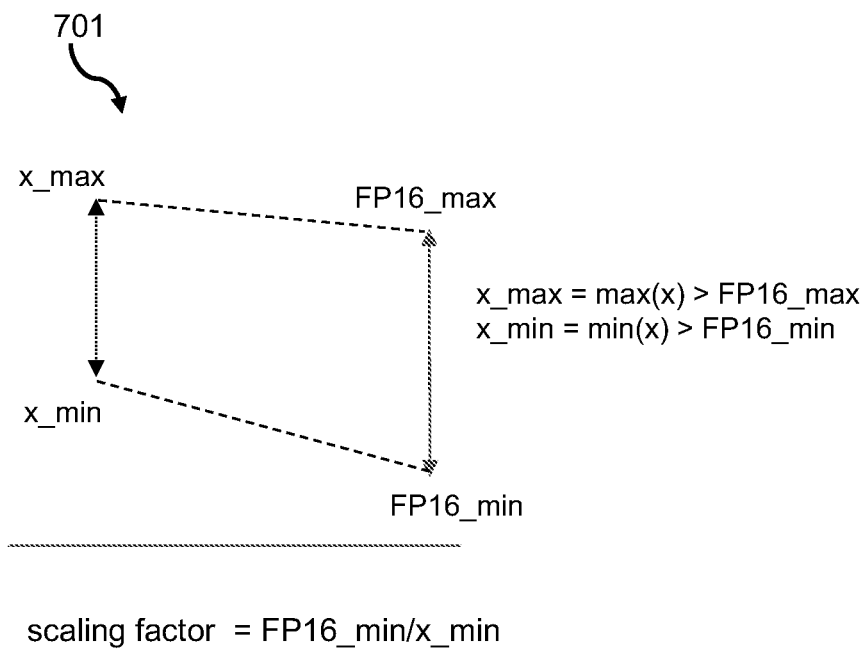

FIGS. 7A and 7B are mathematical diagrams illustrating processes of performing a dynamic range adjustment of input data, according to some embodiments. In examples such as those illustrated in FIGS. 7A and 7B, a dynamic range of input data/input records and model values (e.g., threshold values) can be adjusted to match a dynamic range of the second system 20. In some embodiments, when converting to a lower arithmetic precision (e.g., from FP32 to FP16), a dynamic conversion can be performed based on a range of input feature values or a range of node threshold values. For example, if the input feature values and the node threshold values are not using the whole possible range of the lower arithmetic precision, they can be scaled to the whole range of the lower precision values. Generally, one range is sufficient (e.g., a scaling based on the range of node threshold values or a scaling based on the range of input features).

FIG. 7A illustrates an example conversion 700 in which the maximum value of input feature values and node threshold values (x_max) is smaller than the maximum value that can be represented with the lower arithmetic precision, e.g., FP16 numbers (FP16_max). Furthermore, the minimum value of input feature values and node threshold values (x_min) is lower than the minimum value that can be represented with the lower arithmetic precision, e.g., FP16 numbers (FP16_min). This may be expressed as follows:

$$x\_max = max(x) < FP16\_max;$$
$$x\_min = min(x) < FP16\_min$$

In this case, the dynamic conversion could be realized, according to embodiments, by scaling both the input feature values (during inference) and the node threshold values of the tree-based model by a scaling factor F_scale=FP16_max/x_max.

FIG. 7B illustrates an example conversion 701 in which the minimum value of input feature values and node threshold values (x_min) is larger than the minimum value that can be represented with the lower arithmetic precision, e.g., FP16 numbers (FP16_min). Furthermore, the maximum value of input feature values and node threshold values (x_max) is greater than the maximum value that can be represented with the lower arithmetic precision, e.g., FP16 numbers (FP16_max). This condition may be expressed as follows:

$$x\_max = max(x) > FP16\_max;$$
$$x\_min = min(x) > FP16\_min$$

In this example 701, the dynamic conversion may be realized, in some embodiments, by scaling both input feature values and node threshold values by a scaling factor F_scale=FP16_min/x_min.

In both examples 700 and 701, the conversion from the higher precision to the lower precision, e.g., from FP32 to FP16, may be performed using any appropriate conversion techniques. In some embodiments, the conversion can include clipping input values larger than the maximum value in the lower precision to the maximum value in the lower precision (e.g., clipping input values larger than FP16_max to FP16_max). The conversion may also include clipping input values smaller than the minimum value in the lower precision to the minimum value in the lower precision (e.g., clipping input values smaller than FP16_min to FP16_min).

Furthermore, the required number of exponent and mantissa bits may be taken from the number in the higher arithmetic precision (e.g., the FP32 number) to form the lower precision number (e.g., the FP16 number).

The aforementioned three steps for scaling and conversion involve one multiplication for the scaling and one standard conversion. Such a multiplication in floating point can be a rather costly operation in terms of computing effort compared to a standard conversion, the latter only involving up to two comparisons and a bit selection operation.

In some embodiments, the dynamic range adjustment and scaling may be performed by combining the multiplication (scaling) and the conversion into a single operation that involves only one addition or subtraction (e.g., an INT 8 addition or subtraction), up to 2 comparisons, and a bit selection.

In some embodiments, this may be implemented for the example of FP32/FP16 data representation as follows:

If the exponent of the FP16 data representation of the absolute maximum value of input features and node thresholds (E_in_max) is smaller than the maximum FP16 exponent (E_fp16_max), E_offset=E_fp16_max−E_in_max is added to the exponent of the FP32 data representation of both input feature and node threshold values.

If the exponent of the FP16 representation of the absolute minimum value of input features and node thresholds (E_in_min) is larger than the minimum FP16 exponent (E_fp16_min), E_offset=E_in_min−E_fp16_min is subtracted from the exponent of the FP32 representation of both input feature and node threshold values.

The conversion from FP32 to FP16 may be performed in a standard way by clipping input values larger than the maximum value in the lower precision to the maximum value in the lower precision (e.g., clipping input values larger than FP16_max to FP16_max) and by clipping input values smaller than the minimum value in the lower precision to the minimum value in the lower precision (e.g., clipping input values smaller than FP16_min to FP16_min). Furthermore, the required number of exponent and mantissa bits may be taken from the number in the higher arithmetic precision (e.g., the FP32 number) to form the lower precision number (e.g., the FP16 number).

Figure 8:
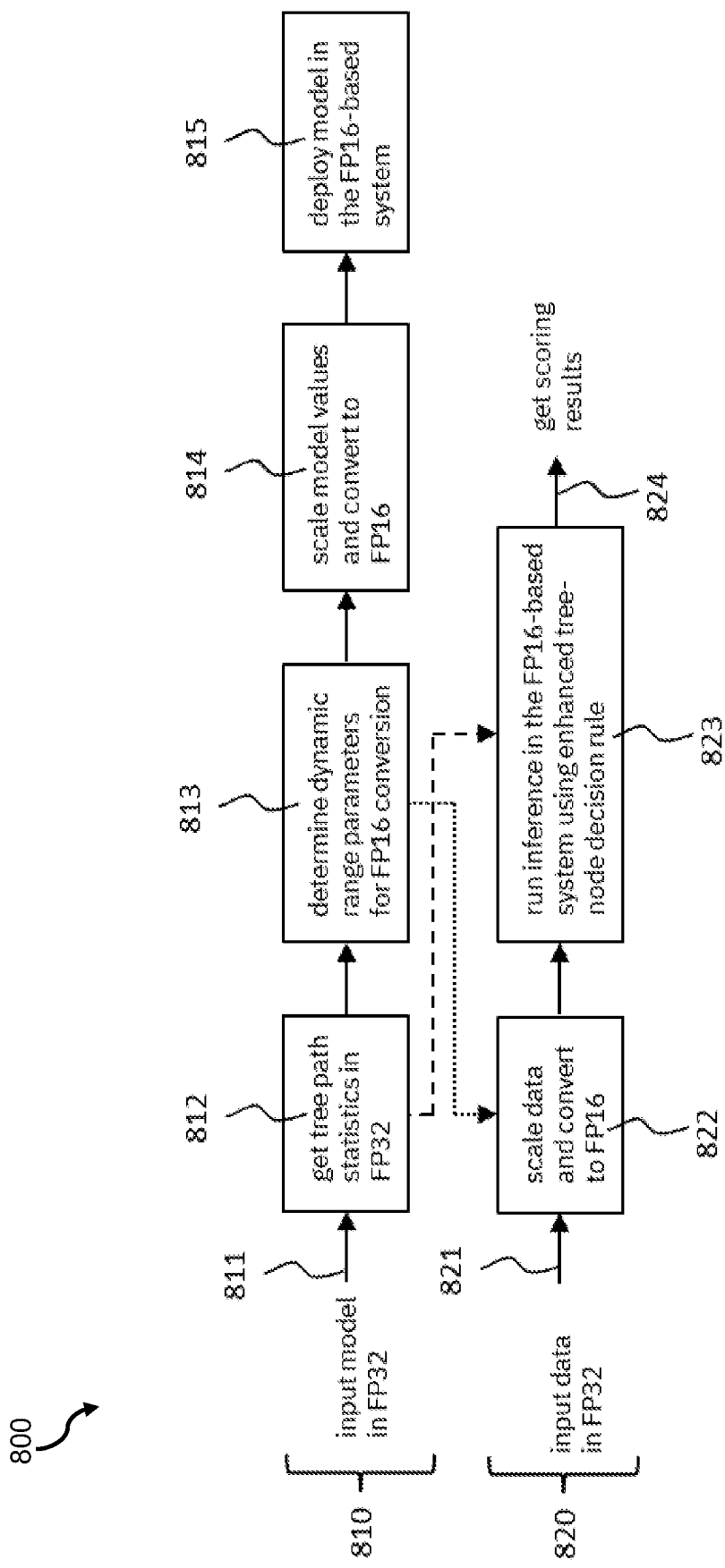
FIG. 8 is a flowchart illustrating a process of training a tree-based model and performing a subsequent machine learning inference, according to some embodiments.

FIG. 8 is a flowchart illustrating a process 800 of training a tree-based model and performing a subsequent machine learning inference, according to some embodiments. In some embodiments, process 800 includes operations that may be the same as, or substantially similar to, those illustrated in FIG. 6. Process 800 includes a set of training operations 810 and inference operations 820 that may be performed, respectively, on the first 10 and second systems 20 illustrated in FIG. 2.

In the training process 810, a tree-based model that includes a decision tree can be provided as input in a first arithmetic precision (FP32). This is illustrated at operation 811. Historical statistical data can also be provided. This is illustrated at operation 812. The historical statistical data can include tree-path statistics provided in the FP32 format. The tree-path statistics can include statistical data collected with training data on the first system 10 at the first precision.

Dynamic range parameters can be determined for conversion to the second precision. This is illustrated at operation 813. Determining the dynamic range parameters may be carried out using techniques discussed above with respect to FIGS. 7A and 7B. Model values (e.g., threshold values of nodes of the decision tree) can then be scaled and converted to the lower second precision (FP16). This is illustrated at operation 814. The scaled and converted model may then be deployed to the second system 20 with the lower second arithmetic precision (FP16). This is illustrated at operation 815.

The process of generating machine learning inferences 820 can include providing input values as input data in the first arithmetic precision (FP32). This is illustrated at operation 821. The input data can be scaled and converted to the FP16 format. This is illustrated at operation 822. As illustrated by the dotted arrow in FIG. 8, scaling and converting of the input data can be based on the dynamic range parameters determined at operation 813.

The inference may then be performed on the second system 20. This is illustrated at operation 823. In an uncertainty area (e.g., in cases of an equal condition with a respective threshold value at a tree node of the decision tree), majority voting based on the historical statistical data may be used as enhanced tree-node decision rules. As illustrated by the dashed arrow in FIG. 8, the historical statistical data may be provided at operation 812.

The respective scoring results are received and may then be used for a corresponding classification. This is illustrated at operation 824.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Various aspects of the present disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method, comprising:
   providing a tree-based model comprising a decision tree that was trained on a first system, the first system configured to perform computations with a first arithmetic precision; and
   performing an inference of the tree-based model on a second system, the second system configured to perform computations with a second arithmetic precision that is lower than the first arithmetic precision, wherein the performing comprises:
   determining that an input feature value is equal to a threshold value of a corresponding node; and
   in response to the determining, using a majority voting to select a respective left or right path of the decision tree based on historical statistical data comprising tree-path statistics.

2. The method of claim 1, wherein the historical statistical data comprises statistical data collected with training data on the first system at the first arithmetic precision before deploying the inference to the second system with the second arithmetic precision.

3. The method of claim 1, further comprising updating the historical statistical data while running the inference.

4. The method of claim 1, wherein the performing the inference further comprises:
   defining, for each node of the decision tree, an upper threshold value in the second arithmetic precision that is greater than a corresponding threshold value in the first arithmetic precision;
   comparing a current input value in the second precision to a corresponding threshold value in the second arithmetic precision and to the upper threshold value in the second arithmetic precision; and
   updating the historical statistical data during the inference in response to determining, based on the comparing, that the current input value is lower than the corresponding threshold value in the second arithmetic precision or greater than the upper threshold value in the second arithmetic precision.

5. The method of claim 1, wherein the performing the inference includes using a tree-traversal algorithm.

6. The method of claim 1, wherein the performing the inference includes using a set of tensor-based operations.

7. The method of claim 6, wherein the tree-based model comprises a matrix-based tree representation, and the method further comprises:

performing operations related to conditional checks at each node of the decision tree including the majority voting by the set of tensor-based operations.

8. The method of claim 6, wherein the set of tensor-based operations comprises multiplications, comparisons, and logical functions.

9. The method of claim 1, wherein the first arithmetic precision is a single-precision floating-point format and the second arithmetic precision is a half-precision floating-point format.

10. The method of claim 1, further comprising:
receiving input data comprising input values in the first arithmetic precision; and
scaling the input data with a predefined scaling factor to match a dynamic range of the second system.

11. The method of claim 10, wherein the tree-based model comprises the predefined scaling factor.

12. The method of claim 10, wherein the scaling is performed by adding or subtracting a predefined offset factor to/from a respective exponent of the input data in the first arithmetic precision.

13. The method of claim 10, further comprising:
clipping input values larger than a maximum value of the second arithmetic precision to the maximum value of the second arithmetic precision;
clipping input values smaller than a minimum value of the second arithmetic precision to the minimum value of the second arithmetic precision; and
taking a required number of exponent and mantissa bits from the input data of the first arithmetic precision.

14. A system, comprising:
a memory; and
a processor communicatively coupled to the memory, wherein the processor is configured to perform a method comprising:
providing a tree-based model comprising a decision tree that was trained on a first system, the first system configured to perform computations with a first arithmetic precision; and
performing an inference of the tree-based model on a second system, the second system configured to perform computations with a second arithmetic precision that is lower than the first arithmetic precision, wherein the performing comprises:
determining that an input feature value is equal to a threshold value of a corresponding node; and
in response to the determining, using a majority voting to select a respective left or right path of the decision tree based on historical statistical data comprising tree-path statistics.

15. The system of claim 14, wherein the first arithmetic precision is a single-precision floating-point format and the second arithmetic precision is a half-precision floating-point format.

16. The system of claim 14, wherein the performing the inference further comprises:
defining, for each node of the decision tree, an upper threshold value in the second arithmetic precision that is greater than a corresponding threshold value in the first arithmetic precision;
comparing a current input value in the second arithmetic precision to a corresponding threshold value in the second arithmetic precision and to the upper threshold value in the second arithmetic precision; and
updating the historical statistical data during the inference in response to determining, based on the comparing, that the current input value is lower than the corresponding threshold value in the second arithmetic precision or greater than the upper threshold value in the second arithmetic precision.

17. The system of claim 14, the method further comprising:
receiving input data comprising input values in the first arithmetic precision; and
scaling the input data with a predefined scaling factor to match a dynamic range of the second system.

18. A computer program product, the computer program product comprising a computer readable storage medium having program instructions embodied therewith, the program instructions executable by a processor communicatively coupled to a memory to cause a device to perform a method, the method comprising:
providing a tree-based model comprising a decision tree that was trained on a first system, the first system configured to perform computations with a first arithmetic precision; and
performing an inference of the tree-based model on a second system, the second system configured to perform computations with a second arithmetic precision that is lower than the first arithmetic precision, wherein the performing comprises:
determining that an input feature value is equal to a threshold value of a corresponding node; and
in response to the determining, using a majority voting to select a respective left or right path of the decision tree based on historical statistical data comprising tree-path statistics.

19. The computer program product of claim 18, wherein the first arithmetic precision is a single-precision floating-point format and the second arithmetic precision is a half-precision floating-point format.

20. The computer program product of claim 19, the method further comprising:
receiving input data comprising input values in the first arithmetic precision; and
scaling the input data with a predefined scaling factor to match a dynamic range of the second system.

* * * * *